United States Patent [19]

Hardin et al.

[11] Patent Number: 5,018,930
[45] Date of Patent: May 28, 1991

[54] LIFTING AND TRANSPORTING DEVICE

[75] Inventors: Gary P. Hardin, Metairie; Ronald Leonard, Slidell, both of La.

[73] Assignee: SID Corp., Inc., Metairie, La.

[21] Appl. No.: 492,479

[22] Filed: Mar. 12, 1990

[51] Int. Cl.$^5$ .................... B60S 13/02; B62B 3/04; B60P 3/40
[52] U.S. Cl. .................... 414/458; 254/8 R; 280/43.11; 280/43.16; 280/47.16; 280/47.26
[58] Field of Search .............. 414/458, 429, 495, 498; 254/8 R; 280/43.11, 43.15, 43.16, 47.16, 47.2, 47.21, 47.23, 47.24, 47.26

[56] References Cited

U.S. PATENT DOCUMENTS

| 2,502,309 | 3/1950 | Byrd | 280/43.11 X |
|---|---|---|---|
| 2,968,490 | 1/1961 | Baus | 280/35 |
| 3,795,336 | 3/1974 | Acker et al. | 414/458 |
| 3,854,747 | 12/1974 | Johnston | 280/47.24 X |
| 4,043,403 | 8/1977 | Anderson et al. | 280/43.23 X |
| 4,664,398 | 5/1987 | Mozer | 280/43.11 |
| 4,664,399 | 5/1987 | Mobley et al. | 414/495 X |
| 4,666,181 | 5/1987 | Wegner | 280/43.23 X |
| 4,820,110 | 4/1989 | Efird | 414/458 |
| 4,936,733 | 6/1990 | Girerd | 414/458 |

FOREIGN PATENT DOCUMENTS

| 1040275 | 10/1953 | France | 414/458 |
|---|---|---|---|
| 1220961 | 3/1986 | U.S.S.R. | 414/498 |

Primary Examiner—David A. Bucci
Assistant Examiner—Robert S. Katz
Attorney, Agent, or Firm—George A. Bode; Michael L. Hoelter

[57] ABSTRACT

A lifting and transporting device for heavy loads having a lower indented toe region therein, easily adjustable along both its length and its width dimensions so as to conform to the load it is to carry. Individual wheel assemblies are used for such transportation with each such wheel assembly having an abutment plate that pivots about a support plate. Since each end of an adjustable tube (that fits within the indented toe region of the load) is secured to the abutment plate, this end of the tube, and its respective corner of the load, is raised whenever the abutment plate is raised and subsequently locked in place.

12 Claims, 6 Drawing Sheets

LIFTING AND TRANSPORTING DEVICE

BACKGROUND OF THE INVENTION

1. Field of the Invention

This invention pertains to a cart or dolly for lifting and moving heavy and awkward objects such as business machines and, more particularly, to a wheeled dolly for the installation/removal of photocopy machines.

2. General Background

The use of a wheeled cart to move bulky, heavy, or otherwise cumbersome machines is well known in the art. It is also well known to customize these carts to the load they are to carry so as to increase their efficiency. In the case of U.S. Pat. No. 2,450,690 to Robins, U.S. Pat. No. 2,551,097 to Cole, and U.S. Pat. No. 3,250,513 to Fenner et al., a pair of two-wheeled hand carts are customized to not only grip the load but to lift it as well, thereby enabling the load to be wheeled where needed. For each of these cases, however, one edge of the load must first be raised so that a portion of the cart can be positioned underneath it prior to lifting. This, of course, is not always possible.

In other cases, such as U.S. Pat. No. 2,491,953 to Coats, U.S. Pat. No. 2,822,944 to Blomgren, and U.S. Pat. No. 4,664,399 to Mobley et al., the load is either placed on the cart or the cart is inserted underneath the load and then raised so that the load can be transported elsewhere. However, if the load is so great that it cannot be lifted onto the cart, or if there is insufficient clearance under the load to insert the cart, these devices are of little use.

U.S. Pat. No. 2,628,068 to Sehnert discloses a cart upon which the load is permanently positioned such that each load requires its own individual cart. Such devices are not useful if the user desires to use the same cart for transporting a variety of loads.

U.S. Pat. No. 2,968,490 to Baus discloses a series of separate dollies that are secured to opposite sides of the load to be moved. This patent does not teach a cart per se, but instead teaches a means and apparatus for independently securing a two-wheeled dolly to an end of a load for transportation purposes.

Perhaps the most pertinent art known to the applicants are U.S. Pat. No. 3,633,774, U.S. Pat. No. 3,809,261, U.S. Pat. No. 3,918,597, and U.S. Pat. No. 4,037,739 all to Lee. Each of these patents disclose a cart designed to transport a photocopy machine. This cart requires a certain amount of clearance underneath the photocopy machine so that a sled can be positioned thereunder. Of course, this clearance may not always be available on every model or make of machine.

It is thus an object of the present invention to disclose a means and apparatus for transporting large loads such as photocopy machines. Another object of this invention is to disclose a cart that is fully adjustable in both length and width so as to accommodate a variety of differently sized loads. Another object of this invention is to provide a cart that does not require a sled to be positioned underneath the load before it can be lifted. Still another object of this invention is to provide a cart that does not require any part or edge of the load to be lifted so as to insert or install the cart prior to the lifting of the load by cart. These and other objects and advantages of this invention will become obvious upon further investigation.

SUMMARY OF THE PRESENT INVENTION

The preferred embodiment of the apparatus of the present invention solves the aforementioned problems in a straight forward and simple manner. This invention pertains to a cart for hauling and moving heavy loads that are configured having an indented bottom toe region therein. It incorporates a pair of extendable tube assemblies that extend within this indented bottom toe region. Each extendable tube assembly is, in turn and at its opposing ends, secured to a wheeled assembly that includes an abutment plate pivotally secured to a support plate, all of which are supported above the floor by a wheel. A stop plate is fixedly secured to each support plate while at least one brace plate is secured to each abutment plate. Fastening means are supplied to lock the stop and brace plates together, thereby preventing any continued rotation of the abutment plate about the support plate. While the length of the cart is easily adjusted by the pair of extendable tube assemblies, the width of this invention is equally adjustable by width adjusting means that secure adjacent wheel assemblies together. Lever means are also incorporated so as to pivot the abutment plate about the support plate.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
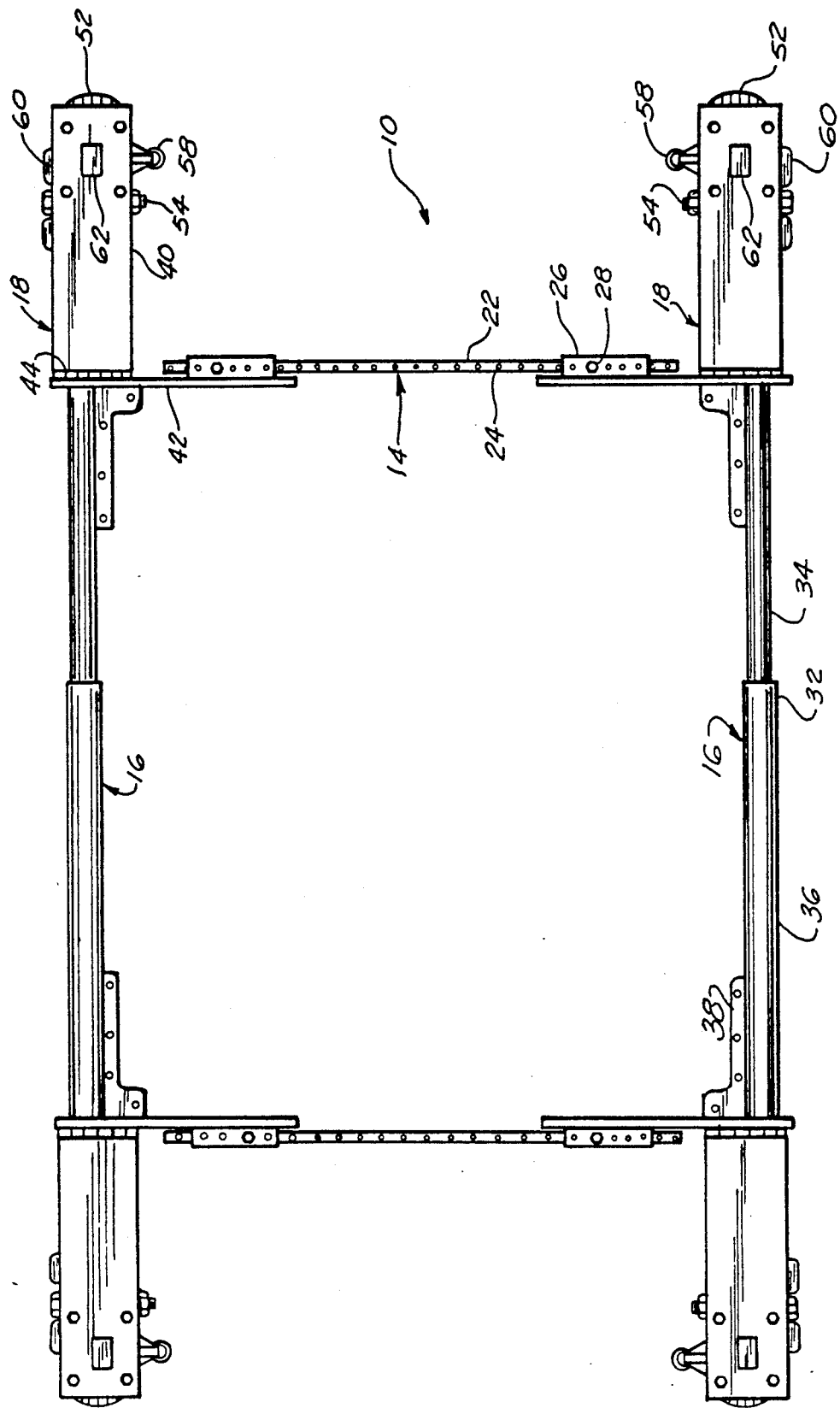
FIG. 1 is a top plan view of the preferred embodiment of the apparatus of the present invention.

Referring now to the drawings, and, particularly FIGS. 1-5, there is shown cart 10 for hauling and moving a large load such as photocopy machine 12. As can be seen, assembly 14 enables the width of cart 10 to be fully adjustable while assembly 16 enables the length of cart 10 to be equally adjustable. A plurality of hinged plate assemblies 18 connect between these separate width and length assemblies 14 and 16, and are, in turn, supported by wheel assemblies 20.

Figure 2:
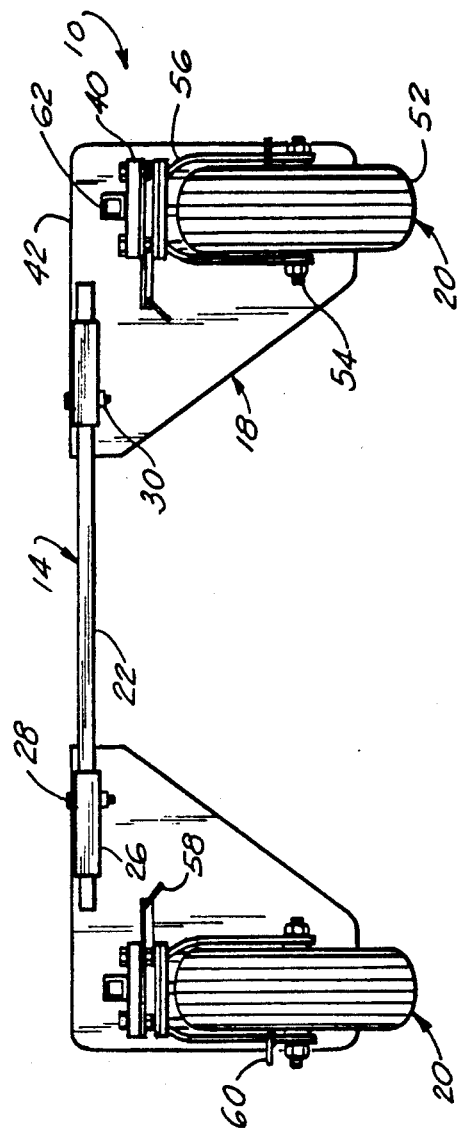
FIG. 2 is a front elevational view of the embodiment of FIG. 1.
Figure 4:
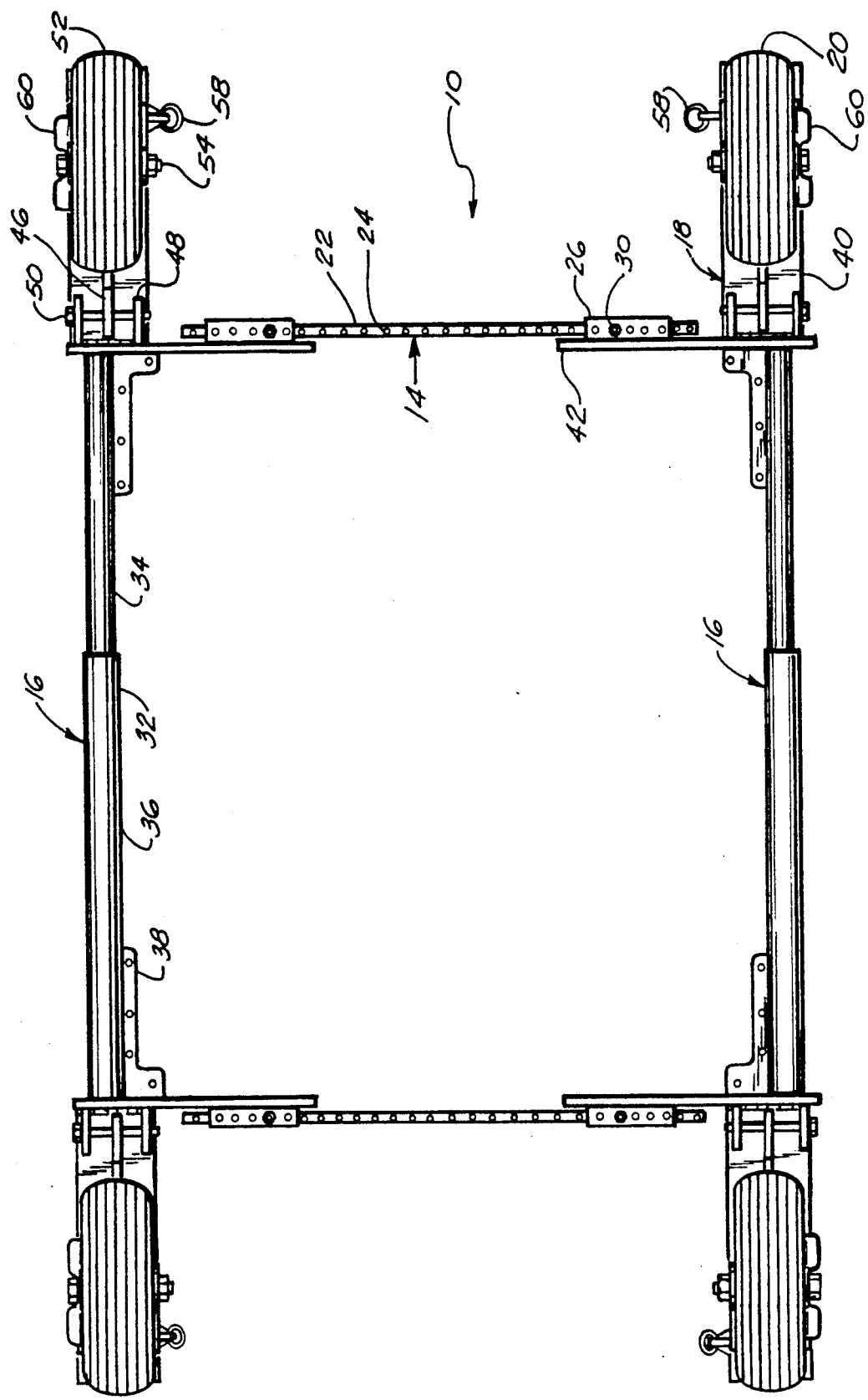
FIG. 4 is a bottom plan view of the embodiment of FIG. 1.
Figure 5:
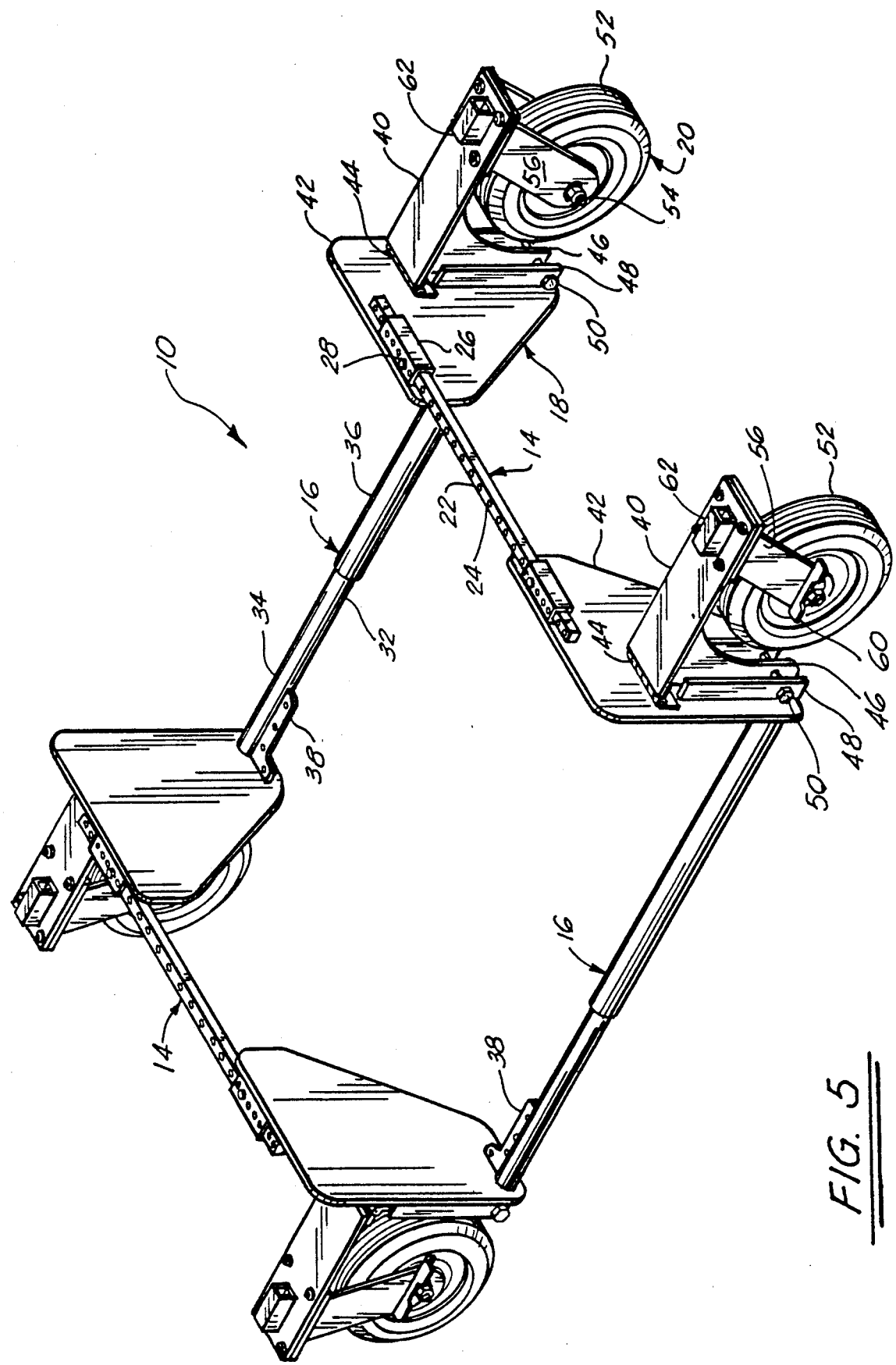
FIG. 5 is a top perspective view of the embodiment of FIG. 1.

Referring now more specifically to FIGS. 1, 2 and 4, width adjusting assembly 14 consists of bar 22 extending between adjacent plate assemblies 18. Bar 22 contains a series of pin openings 24 along its length to aid in the selection and subsequent retention of a proper width dimension. As can be seen, each end of bar 22 slides through bar guide 26 secured to its respective plate assembly 18. Bar guide 26 itself is configured having a plurality of pin openings therein so that once a width dimension is selected, pin 28 may be inserted through aligned pin openings 24 in both bar guide 26 and bar 22. Oftentimes, a nut or cotter pin 30 is used to secure pin 28 in place and to prevent it from becoming dislodged from bar guide 26.

Figure 3:
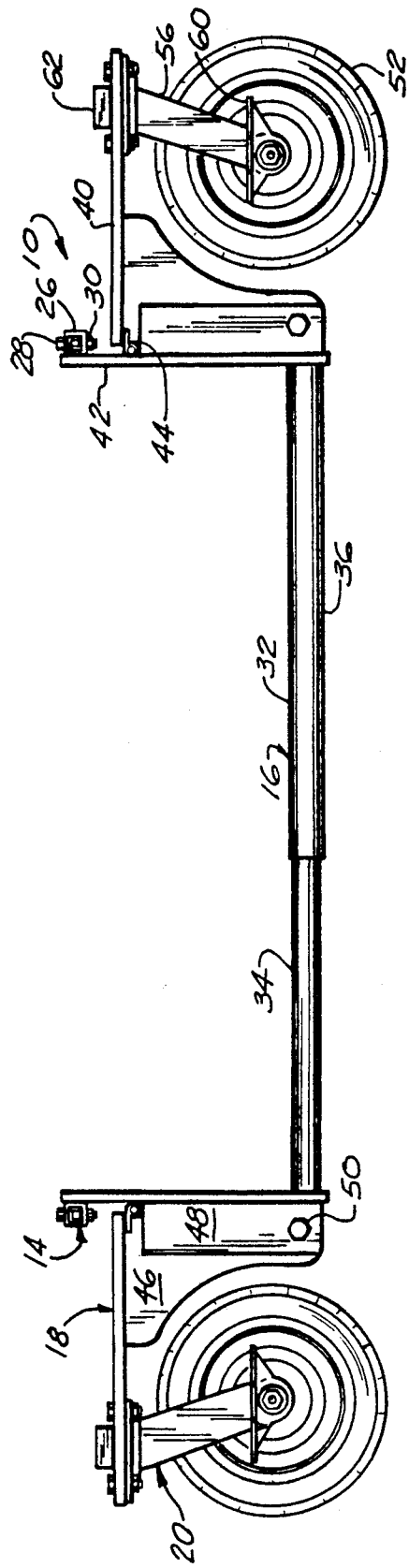
FIG. 3 is a side elevational view of the embodiment of FIG. 1.

Referring now more specifically to FIGS. 1, 3 and 4, length adjusting assembly 16 comprises sliding tube 32 connected between adjacent plate assemblies 18. Each end of sliding tube 32 is fixedly secured to its respective plate assembly 18 with the length adjustment of cart 10 being accomplished by sliding smaller tube 34 within larger tube 36. In this fashion, the opposite longitudinal ends of cart 10 may be completely separated from each other, a feature useful during the loading and unloading stages as will be discussed later. The alignment and rigidity of tubes 34 and 36 are maintained by braces 38 which are also fastened to plate assembly 18.

Figure 6:
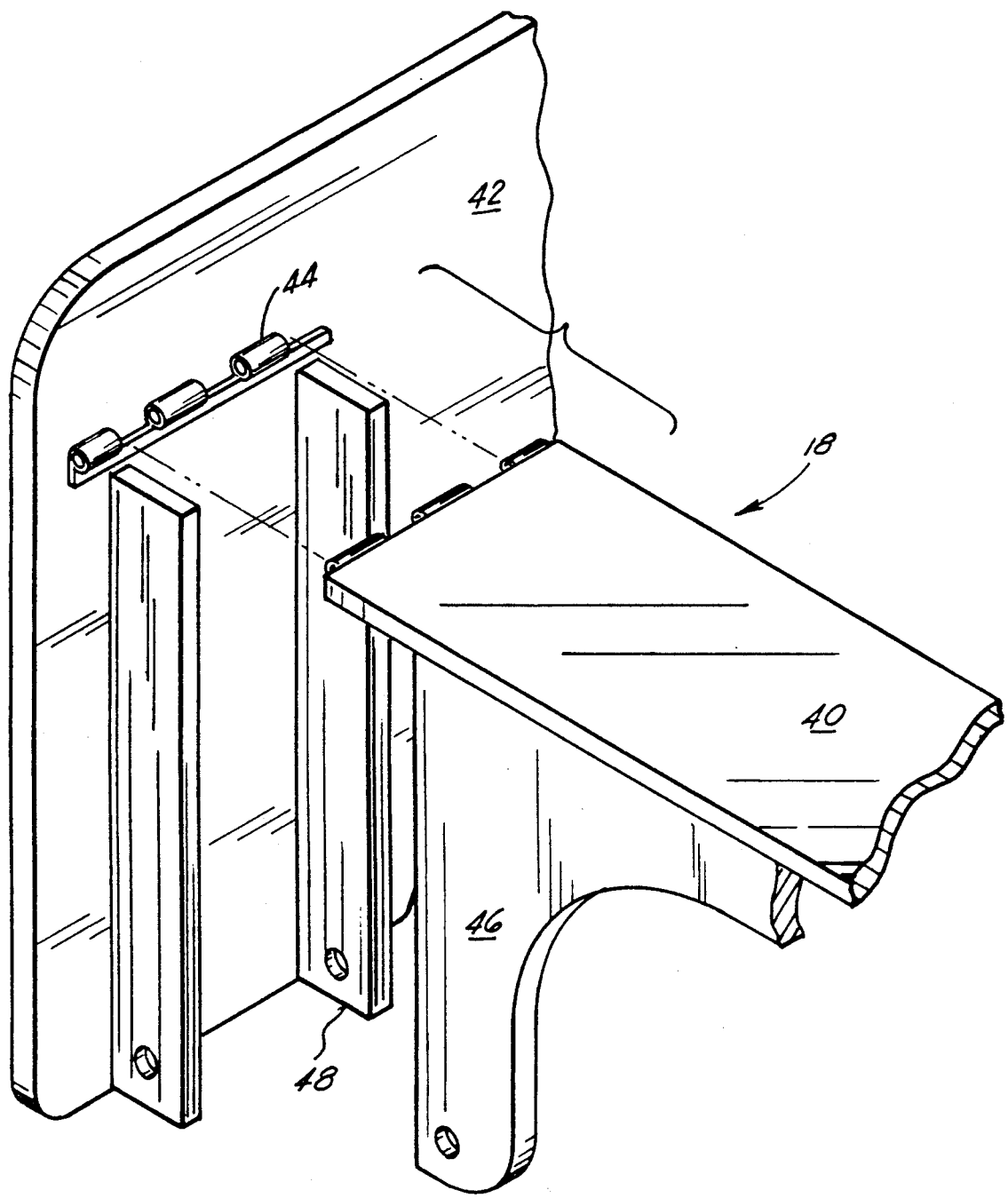
FIG. 6 is a detailed perspective view, partially cut away, illustrating a typical detail of the wheel assemblies.

Referring now to all of the drawings, and in particular FIG. 6, hinged plate assembly 18 consists of horizontal support plate 40 from which vertical abutment plate 42 pivots by means of interconnecting hinge 44. Fixedly secured underneath horizontal support plate 40 is stop plate 46 containing a lower pin opening therein. This stop plate 46 is located intermediate a pair of brace plates 48 that are fixedly secured to vertical plates 42. In this fashion, as vertical plate 42 pivots around hinge 44, so do brace plates 48 while both horizontal plate 40 and stop plate 46 remain stationary with respect thereto. The lower end regions of brace plates 48 also contain a pin opening therein such that when horizontal and vertical plates 40 and 42 are properly aligned with respect to each other, a pin 50 may be inserted through the pin openings in both brace plates 48 and stop plate 46. This effectively prevents any further rotation between plates 40 and 42. Of course, a nut or cotter pin can be used to secure pin 50 in place and to prevent it from accidentally disengaging brace and stop plates 46 and 48.

Referring now to each wheel assembly 20, there is shown wheel 52 and axle rod 54. Secured to the opposite end of each axle rod 54 is angled U-shaped bracket 56 which extends above and to one side of wheel 52. U-shaped bracket 56 is, in turn, pivotally secured to the underneath side of horizontal support plate 40. In this fashion U-shaped bracket 56 enables wheel 52 to freely rotate about a vertical as well as a horizontal axis. Locking pin 58 is used to secure wheel 52 in a selected position about the above vertical axis if so desired. Additionally, brake plate 60 is used to slow down or stop cart 10 as needed.

Secured to the upperside of horizontal support Plate 40, and PreferablY in alignment with the offset U-shaped bracket 56, is lever guide 62. Lever guide 62 is configured to accept lever 64 that is used during the lifting operation. The positioning of lever guide 62 and the offset nature of U-shaped bracket 56 enables axle rod 54 to act as a fulcrum during the lifting operation.

Figure 7:
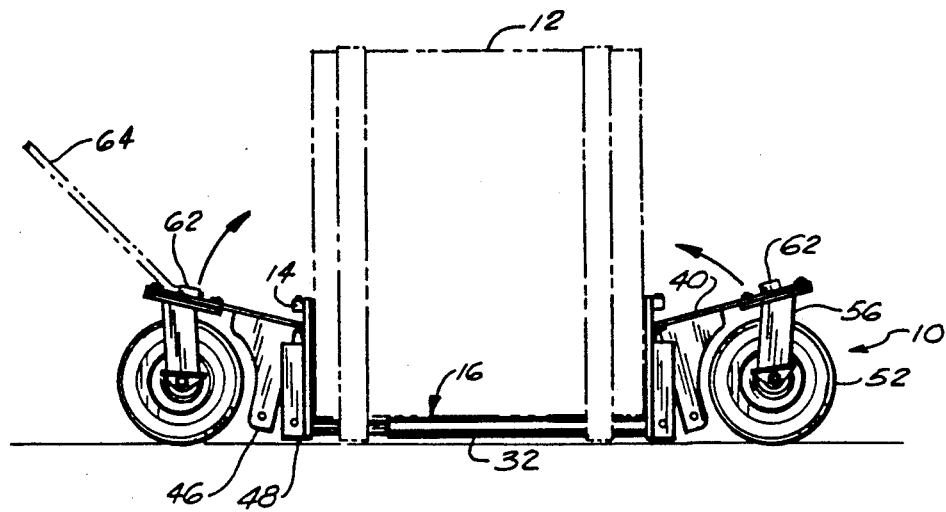
FIGS. 7-9 are side elevational views illustrating the operation of the preferred embodiment of the present invention.
Figure 8:
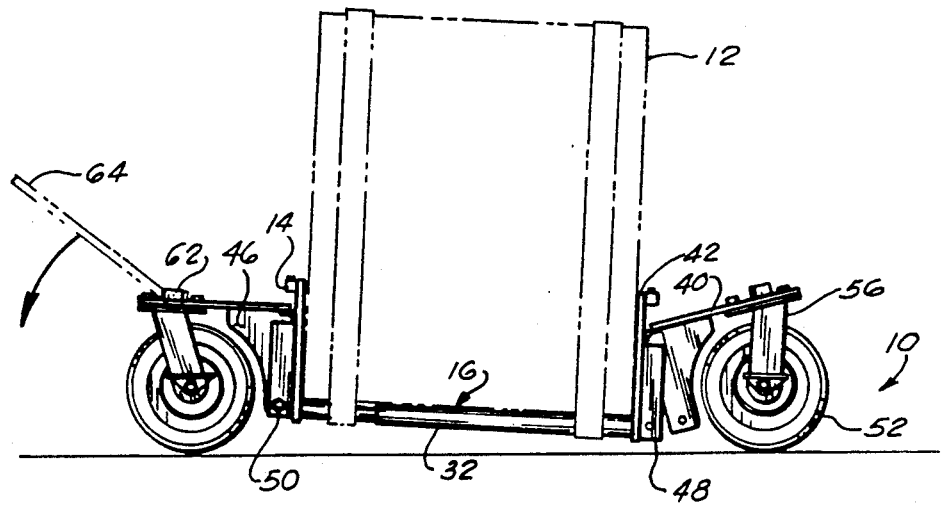
Figure 9:
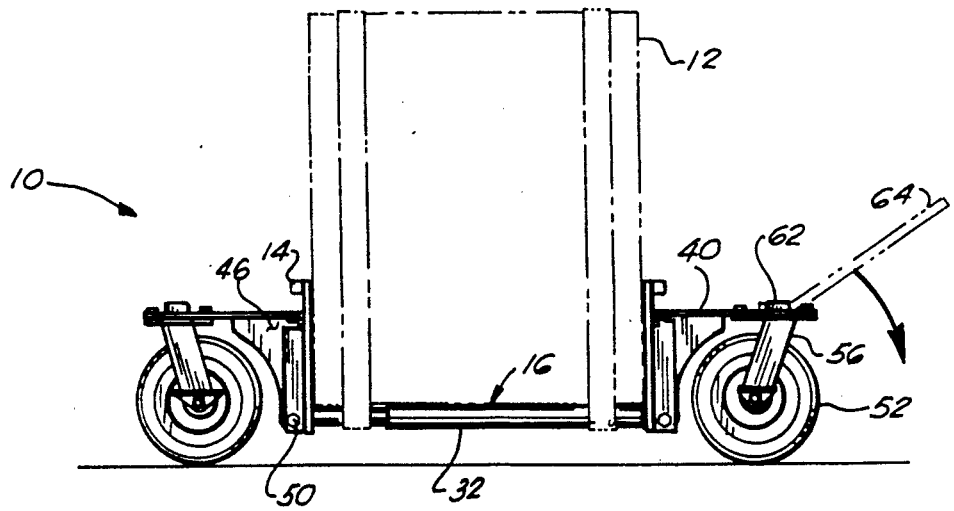

Referring now more specifically to FIGS. 7, 8 and 9, the operation of cart 10 is disclosed. Prior to engaging machine 12, the two halves of cart 10 are separated from each other by sliding small tube 34 from within large tube 36. Also, the width of cart 10 is adjusted as needed by inserting pin 28 in the proper pin opening 24. Afterwards, pin 50 is disengaged from stop plate 46 and brace plates 48, thereby enabling vertical abutment plate 42 to freely rotate about hinge 44.

After positioning the separated halves on either side of load 12, each of tubes 34 and 36 are inserted along the outer bottom edge of load 12 within the indented toe region of load 12. Thus, tube 32 is positioned underneath a portion of load 12 without having to first lift an edge of it. Of course, smaller tube 34 would now be reinserted within larger tube 36 with each of the vertical abutment plates 42 engaging a side of load 12 as shown.

With wheels 52 locked in place and with the brakes engaged, lever 64 is positioned within lever guide 62 and moved downward, thereby raising vertical abutment plate 42. While being so raised, vertical plate 42 is pivoted about hinged 44 until pin 50 can be reinserted through the pin openings in the brace and stop plates 48 and 46. Once inserted, pin 50 is secured in place, thereby supporting that portion of load 12 above the floor. This operation is repeated for each of wheel assemblies 20 until all of load 12 is supported on cart 10.

When finally loaded on cart 10, wheels 52 are once again allowed to freely rotate by removing locking pin 58 and releasing brace plate 60. After load 12 is moved to its desired position, wheels 52 are locked in place and pin 50 is selectively removed from each of wheel assemblies 20 so that load 12 can be systematically unloaded from cart 10. To accomplish this feat, lever 64 which has been inserted within lever guide 62, is allowed to move upward, thereby causing vertical abutment plate 42 to move downward. After this corner of load 12 is again resting on the ground, the same procedure is followed by each of the other three wheel assemblies 20. Afterwards, small tube 34 is removed from large tube 36 and cart 10 is fully disengaged from load 12.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for lifting and transporting heavy loads having an indented toe region therein comprising:
   (a) a pair of extendable tube assemblies each configured to fit within the indented toe region of a load to enable lifting and for supporting said load in a transport position;
   (b) a wheel assembly secured to the opposite ends of both said extendable tube assemblies, each said wheel assembly comprising an abutment plate pivotally secured to a support plate connected to a wheel;
   (c) a stop plate fixedly secured to said support plate;
   (d) at least one brace plate fixedly secured to said abutment plate;
   (e) removable fastening means for securing said stop and said brace plates together to prevent continued rotation of the one with respect to the other in a transport position;
   (f) width adjusting means securing adjacent wheel assemblies together for adjusting the width dimension between said extendable tube assemblies; and,
   (g) lever means secured to each said wheel assembly for pivoting said support plate with respect to said abutment plate; and
   whereby said tube assemblies are inserted in said toe region of said load with the load on a support surface, and upon pivoting of said wheel assemblies the load is lifted and supported on said extendable tube assemblies.

2. The apparatus of claim 1, wherein said fastening means comprise a pin opening in each of said stop and said brace plates and a pin for insertion therethrough.

3. The apparatus of claim 2, wherein said stop plate extends downwardly from said support plate with said pin opening in a lower region thereof and wherein each of said brace plates is positioned adjacent said stop plate with similarly sized and located pin openings therein.

4. The apparatus of claim 3, wherein each of said wheels is fully pivotable about both a horizontal and a vertical axis.

5. The apparatus of claim 4, wherein each of said wheel assemblies comprises brake means for restricting the rotation of said wheels about said horizontal axis and comprises locking means for locking said wheels in a specific position with respect to said vertical axis.

6. The apparatus of claim 5, wherein each of said extendable tube assemblies comprises a smaller tube sized to slide within a larger tube at one end of each said tube with the other end of each of said tubes being secured to its respective wheel assembly.

7. The apparatus of claim 6, wherein said smaller tubes are separable from said larger tubes.

8. The apparatus of claim 7, wherein said width adjusting means comprise a bar extending between said adjacent wheel assemblies and sliding within a bar guide secured to each of said wheel assemblies for aligning and securing said bar thereto.

9. The apparatus of claim 8, wherein said bar and said bar guide are configured with a series of openings therein sized to insert a pin therethrough to lock said bar in place with respect to said bar guide.

10. The apparatus of claim 9, wherein said abutment plate and said support plate are connected together by a hinge.

11. The apparatus of claim 10, wherein said lever means comprise a removable lever arm and, secured to each said wheel assembly, a lever guide.

12. The apparatus of claim 11, wherein each of said lever guides is secured to said support plate in an offset position so as to enable said wheel to act as a fulcrum during the pivoting of said abutment plate.

* * * * *